June 10, 1947. S. LIPSIUS 2,421,952
PURIFICATION OF COPALS
Filed Oct. 28, 1943
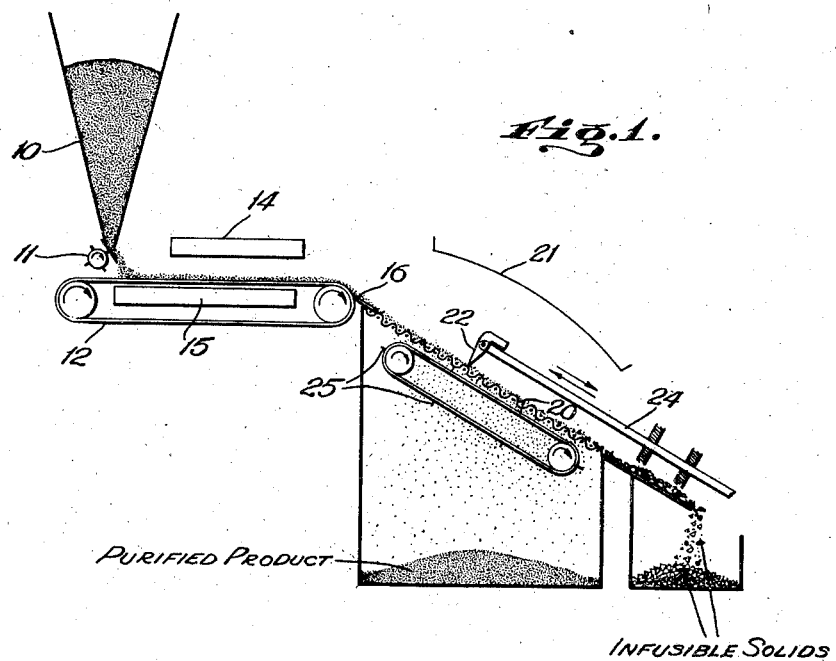
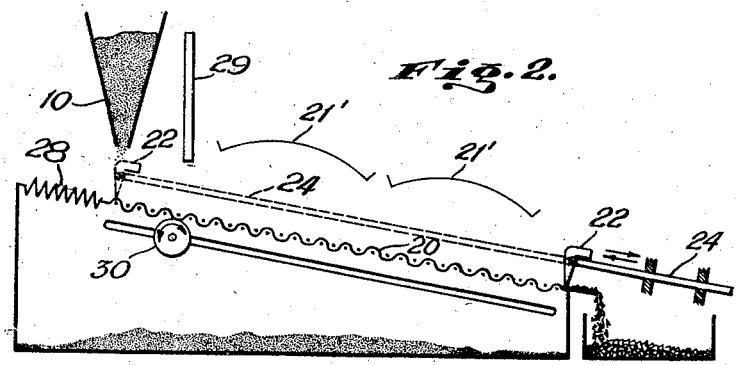
INVENTOR
SAMUEL LIPSIUS
BY Franklin R. Jenkins
AGENT Patented June 10, 1947

2,421,952

UNITED STATES PATENT OFFICE 2,421,952

PURIFICATION OF COPALS

Samuel Lipsius, New York, N. Y.

Application October 28, 1943, Serial No. 508,078

4 Claims. (Cl. 106—240)

This invention relates to means and methods for producing copal resinous substances, particularly for hot melt coatings, varnishes, lacquers and the like and has as one of its main objects making available copal resin in specially treated form, free from infusible and insoluble material, of lower fusion point and viscosity and almost colorless, so that it may be used to better advantage wherever an improved copal resin is required, as for hot melt coating which requires a very hard, thin, flexible and permanent almost colorless film.

Objects sought are to make available a process of treating copal resin, so that it will not be necessary to sort and grade some 35 or more different grades as at present but that many kinds can be blended together to form grades of uniform color, fusion and viscosity, and to eliminate from said resins the infusible and insoluble foreign matter without undue discolorization.

Another object is to make available an improved copal resin free of foreign infusible and insoluble matter.

Another object is to make such improved copal powdered resin available almost snow white and quickly soluble in alcohol, so practically anyone can make a copal varnish, by merely dissolving the fine powder in alcohol.

Another object is to simultaneously lower the fusion point of such copal resin and clean it of infusible and insoluble matter without undue discolorization.

Another object is to make copal more suitable as a hot melt for coatings of thin, high gloss, varnish-like, flexible and permanent films.

Another object is to make copal resin suitable as a raised printing powder.

Another object is to make available a simple process that will not necessitate the enormous amount of hand and mechanical labor now necessary in handling of copal resin in commerce.

Since copal resins come from foreign shores and from various countries, and are harvested at different periods, the original gatherers, dealers, exporters and importers, all must keep a large quantity of copal properly labeled and classified as Manila, Maccassar, W. S., Ma, Philippine Manila, Manila Singapore, Pontianak, Bola, and a dozen or more other types and grades. One pound of resin as now purchased is not equivalent to a pound of soluble or usable resin and at present a lack of uniformity exists within each grade and between different lots of same grade.

Copal resin is an exudation product of trees found in some parts of Africa, Netherlands East Indies, Philippines and other parts of the world, and is marketed in various grades and conditions of impurity, containing foreign matter of infusible and insoluble nature with which it becomes mixed, more or less, from lying on the ground in a somewhat soft state before being harvested.

The resin, or family of resins may be from recent exudations of living trees or from fossilized exudations of trees long dead. Its fusion point is also greatly affected, depending on how long after its exudation it is harvested and this also, to some extent, affects its color and its solubility. As a rule the longer the time between the exudation and harvest and final marketing, the harder the resin, higher fusion point, etc.

Because of such impurities and foreign matter, variations in fusion point and different degrees of solubility result. A given commercial bag of such resin may also contain mixtures of resins from different crops and harvests, so as to present quite a problem of manipulation in the arts where a clean, uniform product is desirable.

It must be understood that copal is not just the name of one specific resin with an exact fusion point, but rather for a family of resins of approximately same character from different parts of the world. It is particularly noted for its very high viscosity and high melting point of about 115–135° C., while it softens at temperatures some 20–40° C. lower. Copal cannot be melted down alone, in a fountain as are some softer and lower fusing resins, such as damar resin for instance, without badly discoloring, decomposing, etc. Heating for even a very short period causes discolorization.

When heat is first applied, copal begins to soften and then melt with the distillation of volatile terpenic oils. The longer the heating is continued the greater is the loss of such volatile oils and the greater the discolorization. Hence in my process I prefer to heat copal in a ground state in thin layers so that it may be uniformly heated and more quickly melted so that discolorization due to local over-heating is avoided.

Filtration under heat, vacuum and pressure has been proposed for the purification of this resin, after so-called "dry cleaning" has been accomplished to eliminate the bulk of the foreign matter. It has been suggested to melt soft copals, as Manila MA, and W. S. and place them in a brass cylinder under a weighted piston, and immerse the cylinder in a heated oil bath. The heating is continued for several hours at 180° to 200° C. under about 100 pounds pressure to force it through a screen of about 140 mesh. Such high and prolonged temperature discolors the resin and results in a loss up to about 25% by weight of the resin, and such method clogs the mesh rapidly and is therefore impractical commercially.

In the drawing Figs. 1 and 2 show diagrammatically two forms of apparatus for carrying out my process.

In my process of heat treating copal resin for the purpose of cleaning it of its infusible foreign substances, I take advantage of the same characteristic of copal resin that I describe in my Patent No. 2,355,919, namely, I have discovered that copal resin melts to a low viscosity only momentarily and that the melting takes place before discolorization takes place. I take advantage of this momentary initial melting stage, of copal and before any great loss of its natural oils and dibasic acids has taken place and before discolorization sets in, to carry out my process of purifying the copal by straining off its foreign infusible and insoluble matter.

*Example*

It must be understood that in dealing with this natural resin, which may consist of pieces from various crops, etc., with variation in its fusion point, that it is very sensitive to discolorization and that it must be fused to a low enough viscosity to pass through an approximately 100 to 140 mesh screen before undue discolorization takes place.

The first step in my process is proper grinding of the resin. This must, as a rule, not be too fine, since by fine grinding some of the fine foreign matter that it is desired to eliminate will also pass through the mesh, hence the grinding must produce a grind substantially coarser than to pass the mesh used for straining the melted copal resin. If, say, a 100 mesh is used through which to strain the resin then the ground resin should not exceed say 70 mesh for the finest of the grind and none over 20 mesh for the coarser grading or thereabouts. Consideration must also be given as to the commercial grade of raw copal resin being so treated. The so-called soft copals, known as "Manila" M A or W S and the like which are mostly resins of recent crops and have not become hard by aging, because they contain the greatest amount of the natural oils and dibasic acids and have not oxidized with age, are of lower fusion point, though solid. Such resins may be strained in the manner disclosed by considerably coarser grinding than the regular or, comparatively speaking, harder Manila resin and may require no addition of plasticizing or color retardant chemicals.

The harder fusing copals however will require higher temperature to melt and pass fine mesh without undue discoloring, hence more care in their grinding will be required as indicated above and in addition plasticizing and color reducing chemicals may be incorporated in the resin before melting and straining through mesh, in order to still further aid quicker fusion and prevent discolorization.

If for the purpose required the harder copals are to be used, such as "Kauri," which is classed as the hardest of the alcohol soluble copal resins or "Pontianak" or "Loba" which are next in order, the grinding should be a little finer and not exceed 30 mesh for the coarser and about 70 or 80 mesh for the finest, the coarser particles may be, of course, reground. These figures are given by way of example and other sizes are operative.

The next step is the incorporation of the plasticizer which in most cases is sufficient without addition of color retardant for the Manilas, since proper plasticizing chemicals by aiding fusion automatically help to prevent discolorization, but such high fusion copals as "Kauri" may also require a color retardant chemical as well. The plasticizers that may be used with copals are quite numerous, practically any of the higher boiling solvents for copal may be used as the plasticizing agent. Since too quick evaporating solvents would evaporate even before reaching the melting stage, the plasticizer selected for the purpose must therefore be of such high boiling point as will not volatilize entirely under the degree of heat used for the particular kind of copal treated. To illustrate, if the soft Manila resins, whose fusion point is about 100° C. are being treated, then a plasticizer whose boiling point is about as low as 125° C. can be used, but higher boiling points are not harmful. Dibutyl phthalate can be used with excellent results. Furthermore the plasticizer need not be in a true sense a solvent for copal, but must be compatible sufficiently to be fairly soluble under heat to act as a sort of flux.

The following table serves to illustrate the types of copal suitable for use in my process but other similar copals may be used.

|  | Average Softening Point | Melting Point |
|---|---|---|
|  | ° C. | ° C. |
| Manila W. S., Soft | 85 | 120 |
| Manila M. A., Soft | 80 | 120 |
| Loba | 82 | 123 |
| Singapore Manila | 90 | 125 |
| Philippine Manila | 85 | 122 |
| Pontianak | 90 | 132 |
| Boea Manila | 80 | 130 |
| Mauri | 105 | 135 |

All copals mentioned are sufficiently compatible with, dibutyl phthalate, triethylene glycol di-2 ethylbutyrate also known as "Flexol," triethanol amine, dipropylene glycol, ethyl butyrate, castor oil, abietenol, dihydroxy abietenol, linseed oil and the like to answer the purpose of a plasticizer and/or a flux and color retardant for the purpose outlined. These plasticizers etc. can be incorporated at the softening point of the resins at which time no discolorization starts, or they can be incorporated by admixing while still cold by any mechanical means.

Consideration however must be given beforehand as to the ultimate use of the purified copal resin, so that the plasticizer most compatible with added materials may be incorporated. For instance if the purified copal is to be used as an alcohol soluble varnish then the plasticizer both as to the kind and as to the amount, must be such as will be compatible with the resin and not unduly retard the drying qualities of the varnish. Dibutyl phthalate or Flexol will answer the purpose when the copal is used for hot melt or raised printing etc. Triethanol amine in the specified limited amount disclosed makes the copal soluble in the greatest amount of solvents including alcohol, butyl acetate, and linseed oil and the like as is used, in the manufacturing of inks, paints etc.

As before stated in addition to plasticizers, color retardant chemicals may be incorporated, or color retardant chemicals only, since some act both as color retardants and plasticizers. Among such materials are lead stearate, lead oleate, calcium stearate, aluminum oleate, tinsoaps and sorbitan esters of the higher fatty acids, and cadmium maleate.

All said materials should preferably not be incorporated in larger amounts than $\frac{1}{16}$ lb. by weight of plasticizer or color retardant to each pound of resin to keep resin pure and non-tacky for the higher fusion copals and lesser amounts for the soft copals if the final product is to be a non-tacky solid resin at room temperature. Of course larger amounts may be incorporated to serve special purposes. The method of incorporating the plasticizers is important where a solid resin that will not block is the goal. Care must be taken to disperse evenly such a small quantity as $\frac{1}{16}$ of a pound of plasticizer throughout a pound of ground resin so that as even as possible a dispersion will be had, and not have some particles have twice as much plasticizer as others. In order to attain a uniform mix, such dispersion may be accomplished by spraying the resin with plasticizer and thoroughly mixing, or carefully incorporating small batches at a time and bringing the so treated resin to its softening point only (not melting point) under heat. With greater amounts of the plasticizer used, the lower is the fusion point, and the lower the viscosity of the fused resin the greater the output with least discolorization, and the finer screen that may be used. The use of proportions of plasticizer much in excess of 1 to 16 tends to interfere with easy handling of the powder. Therefore as may be seen, the method may be utilized in the first step of manufacturing products using copal resin as the main ingredient, by incorporating the plasticizer or solvent, and resin or other material and fusing the mixture into homogeneous mass, eliminating all infusible matter without discolorization in solid, or in any degree of semi solid state, or plastic masses etc.

One form of apparatus as diagrammatically shown in Fig. 1, by way of example for carrying out my process comprises a hopper 10 for delivering a mixture of ground resin and plasticizer in a thin sheet-like stream preferably at a substantially uniform rate determined by a shaker 11. The resin plasticizer mixture falls upon a conveyor belt 12, preferably of heat conducting material, such as tin foil or other suitable material, on which the resin mixture is preheated to slightly above room temperature by means of upper and lower preheaters 14, 15. The mixture is thinly spread over the conveyor to permit uniform heating of the mixture throughout its depth.

The mixture is removed from the tail end of the conveyor by means of a doctor 16 from which the hot mixture then is passed upon a screen 20 which is preferably inclined at an angle of between about 25 and 45 degrees. The upper third of the screen is preferably about 140 mesh. The intermediate, about 100 mesh and the tail about 90 mesh. On the screen the mixture is heated by means of a heater 21 to melting temperature. A hinged wiper 22 mounted on a rod 24 adapted to be reciprocated is drawn downwardly over substantially the entire work area of the screen, during which stroke the wiper is held against the screen so as to rake infusible matter along and off the screen and force viscous fractions through the screen which will not flow through by gravity. On the return stroke, the wiper swings so as to ride lightly over the upper surface of the screen without any appreciable back action. Means may be provided so that the wiper is completely lifted from the screen and any resin during the return stroke.

Fusible fractions of the mixture pass through the screen as they are softened and/or liquified and are allowed to fall from the heating zone so that discolorization and decomposition will not develop. Viscous fractions which tend to collect on the underside of the screen may be removed by scrapers 25 the ends of which are preferably mounted on link belts beyond the zone of falling resin.

I have found that copal resins fuse to a low viscosity momentarily without discoloring and that when the resins are in such low viscous state, they may be caused to pass the fine screens mentioned.

Since copal resins are in themselves complex mixtures of various materials softening and melting at different temperatures, in my process some of the fractions may actually melt and pass through the screen as would an ordinary low viscosity resin at top of screen while other fractions will melt and pass through further down the screen. Thus the low melting fractions are the first to be removed from the influence of heat. The fractions least susceptible to heat remain subjected to the heat until they are further heated as they are moved down the screen and/or subjected to pressure by the wiper 22. Fractions unaffected by the wiper and increased heat are raked off as infusible. Thus the maximum fusion point of the product is controlled. Since copals vary widely the heating and the speed of the wiper may be varied to meet the particular requirements of various types.

With many of the copals it is preferred that they be held at temperatures at or above their melting point no longer than a few seconds while some may remain melted several minutes without discolorization.

The screen may be more nearly horizontal as shown in Fig. 2 and the resin mixture may be discharged directly upon the screen. The screen should preferably be flexible and held at the feed end by means of a spring or other resilient means 28 and otherwise supported only at the tail end so that the screen may move slightly with the wiper 22 if the latter engages a more tacky portion of the resin. In this manner of operation, the more tacky portion will not be passed over by the wiper until it has been heated a trifle longer in its downward movement, and softened further so as to pass through the screen. On the other hand if the resin is more freely flowing, the wiper quickly passes over it.

Heat may be applied by upper heaters 21' from which it may be desirable to protect the hopper by means of an insulating screen 29. The under side of the screen may be kept clean by rotating rollers 30 engaging the under face of the screen or a scraper 25 as shown in Fig. 1. The yieldable mounting of the screen may be used in Fig. 1.

The hopper is preferably located at a distance 6 inches to 10 inches more or less up from screen, and so that it may be moved, to cause a fall on the screen at any point, if a trifle more wiping is necessary the hopper is located more towards the top of the screen, if less, lower and nearer to center of screen. Heat is applied by any suitable means direct or indirect as heated air, when any material is incorporated that may give off combustible vapors. The fused resin may be made to fall on a conveyor to carry same for the purpose of rapid cooling to prevent the formation of large solid masses or for other treatment elsewhere, as for grinding, or solution or both or any other purpose.

In each species of apparatus the resin is heated to its lowest viscosity momentarily and strained of infusible matter, then quickly removed from the influence of heat before appreciable discoloring may set in.

The tailings raked from the screen may be incorporated with an additional $\frac{1}{16}$ of triethanol amine and dissolved in alcohol, and subjected to centrifugal action while in solution to eliminate foreign infusible and insoluble material and precipitated in water to fine powder after being dried. If however triethanol amine had been used as the original plasticizer or flux in not more than $\frac{1}{16}$, then only about $\frac{1}{32}$ lb. of triethanol amine may be used and any excess quantity will prevent precipitation of the resin as before mentioned.

I have found that if about $\frac{1}{16}$ triethanol amine is used as the plasticizer or fluxing agent, the copal reduces more readily to a low viscosity for passing through fine mesh in eliminating the foreign or infusible matter, and the so-treated copal is more readily soluble in alcohol, for the purpose of a quick drying varnish.

I have also found that a solution in alcohol of such fused copal and triethanol amine does not trap the alcohol solvent and can be made into a snow white almost impalpable powder, by precipitation in water, that retains its alcohol soluble properties.

It is very important however, that no larger amount than about $\frac{1}{16}$ of triethanol amine to a pound of resin be used, as otherwise no precipitation is possible, as larger amounts of triethanol amine will make the copal water soluble, and not precipitate, and will require the evaporation of the water to recover the copal.

Such purified snow white copal powder can be used in the hot melt process as described in my Patent No. 2,355,919, or for any other purpose where a purified and bleached snow white fine powdered copal may be required.

Because of the extreme fineness of this copal powder it dissolves almost at once in its solvents, as alcohol, butyl acetate and the like, so that any one can make a quick drying varnish by merely dissolving the powder in alcohol.

In order to disperse such a small quantity of plasticizer over the larger quantity of resin, the plasticizers themselves may first be diluted in a larger quantity of evaporable solvent so that they may be used more efficiently in a spray gun or other dispersion means, so that after such dispersion the solvent will evaporate and leave the plasticizer perfectly dispersed. To illustrate; when using triethanol amine it can be mixed in 3 or 4 times its quantity of water and the resin treated with the mixture. The resin is then dried to remove the water of dilution and a uniform dispersion of triethanol amine throughout the resin results.

The invention claimed is:

1. A method for purifying copal comprising grinding the copal to substantially pass a 20 mesh screen; mixing the reduced copal with about one sixteenth of its weight of plasticizer to form a mix; spreading said mix in a thin layer upon a screen; quickly heating said layer to melt the fusible portions of the copal; wiping said layer to force fused portions through the screen and rake off foreign matter; and cooling the portion passed through the screen; said layer being thin to permit rapid heating and prevent local overheating of the mix and discoloration resulting therefrom, whereby the fused portion may be held near its fusion temperature only for a minimum length of time.

2. A method for purifying difficultly fusible portions of copal said method comprising, mixing one part by weight of said portions with a substantially one-thirty second part by weight of triethanol amine to form a mixture; subjecting said mixture to alcoholic extraction to form an alcoholic solution of fractions therein; and adding water to said solution to precipitate alcohol soluble copal fractions therefrom, thereby forming a substantially white precipitate.

3. A method of purifying copals comprising reducing the particle size of the copal to a substantially finely divided state, mixing the reduced copal with an amount of plasticizer sufficient to form a mixture capable of passing a 90 to 140 mesh screen when fused, pre-heating the mixture; spreading the preheated mixture in a thin layer upon a screen; quickly heating said layer to melt portions of the copal; applying pressure to the layer to force the melted portions of the copal through the screen; and removing the material passed through the screen and cooling it before discolorization begins, said layer being thin to prevent local over-heating of the mixture and discolorization resulting therefrom and the heat being radiant to effect rapid heat transfer.

4. An apparatus adapted to the purification of copal comprising an inclined screen of mesh varying from about 140 mesh at the upper end to about 90 mesh at the lower end; means for feeding ground copal onto and over the screen; radiant heating means above the screen for heating copal thereon; rake means on the upper face of the screen for wiping copal tailings downwardly over and off the screen; and a receptacle beneath the screen to collect melted copal passing through the screen.

SAMUEL LIPSIUS.

REFERENCES CITED

The following references are of record in the file of this patent:

UNITED STATES PATENTS

| Number | Name | Date |
|---|---|---|
| 1,340,873 | Brooks | May 25, 1920 |
| 2,275,630 | Johnson | Mar. 10, 1942 |
| 2,227,720 | Kallander | Jan. 7, 1941 |
| 2,035,170 | Rankin | June 29, 1937 |
| 287,862 | Robison | Nov. 6, 1883 |
| 1,930,091 | Halvorson et al. | Oct. 10, 1933 |
| 2,300,907 | Bronson | Nov. 3, 1942 |

FOREIGN PATENTS

| Number | Country | Date |
|---|---|---|
| 252,791 | Germany | Oct. 26, 1912 |
| 105/26 | Australia | Dec. 7, 1926 |